US011078825B2

(12) United States Patent
Hu et al.

(10) Patent No.: US 11,078,825 B2
(45) Date of Patent: Aug. 3, 2021

(54) METHOD AND APPARATUS FOR CONTROL OF PROPULSION SYSTEM WARMUP BASED ON ENGINE WALL TEMPERATURE

(71) Applicant: GM GLOBAL TECHNOLOGY OPERATIONS LLC, Detroit, MI (US)

(72) Inventors: Yiran Hu, Shelby Township, MI (US); David E. Edwards, Rochester Hills, MI (US); Min Sun, Troy, MI (US); Michael J. Paratore, Jr., Howell, MI (US); Jun Chen, Novi, MI (US); Eugene V. Gonze, Pinckney, MI (US); Sergio Quelhas, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 16/589,579

(22) Filed: Oct. 1, 2019

(65) Prior Publication Data

US 2021/0095630 A1 Apr. 1, 2021

(51) Int. Cl.

| | |
|---|---|
| ***F01P 7/16*** | (2006.01) |
| ***B60H 1/00*** | (2006.01) |
| ***B60W 20/15*** | (2016.01) |
| ***F02N 19/10*** | (2010.01) |
| ***F02N 19/04*** | (2010.01) |

(52) U.S. Cl.

CPC .......... *F01P 7/167* (2013.01); *B60H 1/00314* (2013.01); *B60H 1/00642* (2013.01); *B60W 20/15* (2016.01); *F01P 7/16* (2013.01); *F02N 19/10* (2013.01); *F02N 19/04* (2013.01)

(58) Field of Classification Search

CPC .... F01P 7/164; F01P 7/167; F01P 7/16; F02N 19/10; F02N 19/04; B60H 1/00642; B60H 1/00314; B60W 20/15; F01M 5/007

USPC ............... 123/41.33, 685, 686, 41.44, 41.08; 701/102

See application file for complete search history.

(56) References Cited

U.S. PATENT DOCUMENTS 4,559,907 A * 12/1985 Hayashi ................ F01P 3/2285 123/41.12
5,121,714 A * 6/1992 Susa ....................... F01P 7/165 123/41.1
5,317,994 A * 6/1994 Evans ....................... F01P 7/16 123/41.1

(Continued)

FOREIGN PATENT DOCUMENTS

JP 2006342680 A * 12/2006
JP 2006342680 A 12/2006

(Continued)

*Primary Examiner* — Sizo B Vilakazi
*Assistant Examiner* — Brian R Kirby
(74) *Attorney, Agent, or Firm* — Quinn IP Law

(57) ABSTRACT

A method includes: (a) determining an engine speed of an internal combustion engine, wherein the internal combustion engine has an engine wall, and the engine wall has a wall temperature; (b) determining an engine load of the internal combustion engine; (c) determining a wall-reference temperature as a function of the engine load and the engine speed of the internal combustion engine; and (d) adjusting, using a cooling system, a volumetric flow rate of a coolant flowing through the internal combustion engine to maintain the wall temperature at the wall-reference temperature.

16 Claims, 3 Drawing Sheets

(56) References Cited

U.S. PATENT DOCUMENTS 5,503,118 A * 4/1996 Hollis .................. F01P 5/10 123/41.08
5,657,722 A * 8/1997 Hollis .................. F01P 7/167 123/41.08
6,178,928 B1 * 1/2001 Corriveau ............... F01P 7/048 123/41.12
6,789,512 B2 * 9/2004 Duvinage ........... F02B 29/0443 123/41.05
6,948,456 B2 * 9/2005 Tomasseli ............... F01P 7/167 123/196 R
6,955,141 B2 * 10/2005 Santanam ............... F01P 7/165 123/41.08
7,080,609 B2 7/2006 Kuze et al.
2003/0143084 A1 * 7/2003 Repple .................. F04D 29/566 417/292
2005/0072385 A1 * 4/2005 Kanno .................... F01P 7/165 123/41.1
2006/0162676 A1 * 7/2006 Pegg ....................... F01P 7/165 123/41.1
2007/0175415 A1 * 8/2007 Rizoulis .................... F01P 7/14 123/41.05
2011/0005474 A1 * 1/2011 Carlson ..................... F01P 5/12 123/41.1
2012/0132154 A1 * 5/2012 Suzuki .................... F01P 7/164 123/41.02
2012/0199084 A1 * 8/2012 Kinomura ............... F01P 7/165 123/41.08
2012/0266828 A1 * 10/2012 Araki ...................... F01P 7/164 123/41.08
2014/0261254 A1 * 9/2014 Gonze ...................... F01P 11/08 123/41.08
2014/0283764 A1 * 9/2014 Abou-Nasr ............. F01P 7/167 123/41.02
2014/0360444 A1 * 12/2014 Morita .................. F02D 35/026 123/41.08
2015/0369179 A1 * 12/2015 Hotta ........................ F01P 3/08 123/568.12
2016/0003355 A1 * 1/2016 Nishida ................ F02D 41/023 477/107
2016/0047293 A1 * 2/2016 Gonze ..................... F01P 7/164 123/41.02
2016/0053665 A1 * 2/2016 Gonze ..................... F01P 7/167 123/41.08
2016/0108795 A1 * 4/2016 Kim .................... F04D 15/0088 701/102
2016/0201548 A1 * 7/2016 Moscherosch .......... F01P 7/164 123/41.02
2016/0230642 A1 * 8/2016 Bilancia .................. F01P 7/167
2016/0356256 A1 * 12/2016 Tofukuji ................. F01P 7/167
2017/0002721 A1 * 1/2017 Naik ....................... F04B 49/02
2017/0022881 A1 * 1/2017 Matsumoto ............... F01P 7/16
2017/0096930 A1 * 4/2017 Murai ....................... F01P 7/14
2017/0107891 A1 * 4/2017 Murai ....................... F01P 5/10
2017/0159546 A1 * 6/2017 Gonze ..................... F01P 7/164
2017/0167330 A1 * 6/2017 Lee ........................ F01M 11/02
2017/0314454 A1 * 11/2017 Sakamoto ................. F01P 3/02
2017/0321597 A1 * 11/2017 Michikawauchi ....... F01P 11/00
2018/0245504 A1 * 8/2018 Murai ..................... F01P 7/048
2019/0040815 A1 * 2/2019 Nishida ..................... F02F 1/40
2019/0085752 A1 * 3/2019 Craft-Otterbacher ..... F01P 3/02
2019/0234291 A1 * 8/2019 Cunningham ............ F01P 1/06
2020/0318567 A1 * 10/2020 Hayakawa ................ F01P 7/16

FOREIGN PATENT DOCUMENTS

JP 4062285 A 1/2008
JP 20122151414 A * 11/2012

* cited by examiner

METHOD AND APPARATUS FOR CONTROL OF PROPULSION SYSTEM WARMUP BASED ON ENGINE WALL TEMPERATURE

INTRODUCTION

The present disclosure relates a vehicle system and methods and, more particularly, the methods and apparatus for control of propulsion system warmup based on engine wall temperature.

The current propulsion system warmup control strategy is based primarily on measured coolant temperature. Such control strategy requires complex control structure with complicated calibrations and cannot achieve optimal control requirements. Therefore, it is desirable to develop a control strategy for warming up the propulsion system that does not rely solely on coolant temperature.

SUMMARY

The present disclosure describes a control method and a vehicle system for warming up a propulsion system without relying solely on coolant temperature. The presently disclosed control strategy works by directly controlling the engine wall temperature during all stages of engine warmup. The engine wall temperature is controlled to simultaneously maintain a desired engine wall temperature while supporting the energy transfer from the engine to other parts of the propulsion system, such as the transmission. The faster response of the engine wall allows for more optimal control of the engine temperature so as to avoid boiling and over-cooling compared to the coolant temperature-based control strategy. This control strategy is also an enabler for the next generation thermal system, where more aggressive low flow and wall temperature control is required.

In an aspect of the present disclosure, the method includes: (a) determining an engine speed of an internal combustion engine, wherein the internal combustion engine has an engine wall, and the engine wall has a wall temperature; (b) determining an engine load of the internal combustion engine; (c) determining a wall-reference temperature as a function of the engine load and the engine speed of the internal combustion engine; and (d) adjusting, using a cooling system, a volumetric flow rate of a coolant flowing through the internal combustion engine to maintain the wall temperature at the wall-reference temperature.

Determining whether oil warming may be needed includes: (a) determining an oil temperature of an engine oil flowing through the internal combustion engine; (b) comparing the oil temperature of the oil engine flowing through the internal combustion engine with a predetermined oil-temperature threshold; and (c) determining that the oil temperature of the engine oil is less than the predetermined oil-temperature threshold. The method may further include applying an oil warming offset to the wall-reference temperature in response to determining that oil warming is needed. Applying the oil warming offset to the wall-reference temperature includes subtracting an oil-warming-predetermined value from the wall-reference temperature.

The method further may include determining that the coolant is boiling. The method may further include applying a boiling mitigation offset to the wall-reference temperature in response to determining that the coolant is boiling by subtracting a boiling-mitigation value from the wall-reference temperature after subtracting the oil-warming-predetermined value from the wall-reference temperature.

The method may further include outputting, by a controller, a final arbitrated wall-reference temperature after subtracting the boiling-mitigation value from the wall-reference temperature and subtracting the oil-warming-predetermined value from the wall-reference temperature.

The method may further include performing an adaptation of the wall-reference temperature to prevent future boiling in response to determining that the coolant is boiling by: (a) determining engine operating conditions of the internal combustion engine when the coolant is boiling, wherein the engine operating conditions includes a boiling-engine load and a boiling-engine speed of the internal combustion engine; and (b) learning a wall-boiling offset table as a function of the boiling-engine load and the boiling-engine speed of the internal combustion engine, wherein the wall-boiling offset table includes a plurality of wall-boiling offset values that are each based on the boiling-engine load and the boiling-engine speed. The method may further include applying a respective wall-boiling offset value of the plurality of wall-boiling points values to the wall-reference temperature by subtracting the respective wall-boiling offset value from the wall-reference temperature.

The cooling system may include a pump and a valve in fluid communication with the pump. The volumetric flow rate of the coolant flowing through the internal combustion engine may be adjusted by adjusting a power of the pump and/or the position of the valve to maintain the wall temperature at the wall-reference temperature. The present disclosure also describes a vehicle system. The vehicle system includes an internal combustion engine including an engine wall. The engine wall has a wall temperature. The vehicle system further includes a cooling system in thermal communication with the internal combustion engine. The vehicle system further includes a controller in electronic communication with the cooling system. The controller is programmed to execute the method described above. For example, the controller is programmed to: (a) determine an engine speed of an internal combustion engine, wherein the internal combustion engine has an engine wall, and the engine wall has a wall temperature; (b) determine an engine load of the internal combustion engine; (c) determine a wall-reference temperature as a function of the engine load and the engine speed of the internal combustion engine; and (d) command the cooling system to adjust a volumetric flow rate of a coolant flowing through the internal combustion engine to maintain the wall temperature at the wall-reference temperature.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding introduction, summary or the following detailed description.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
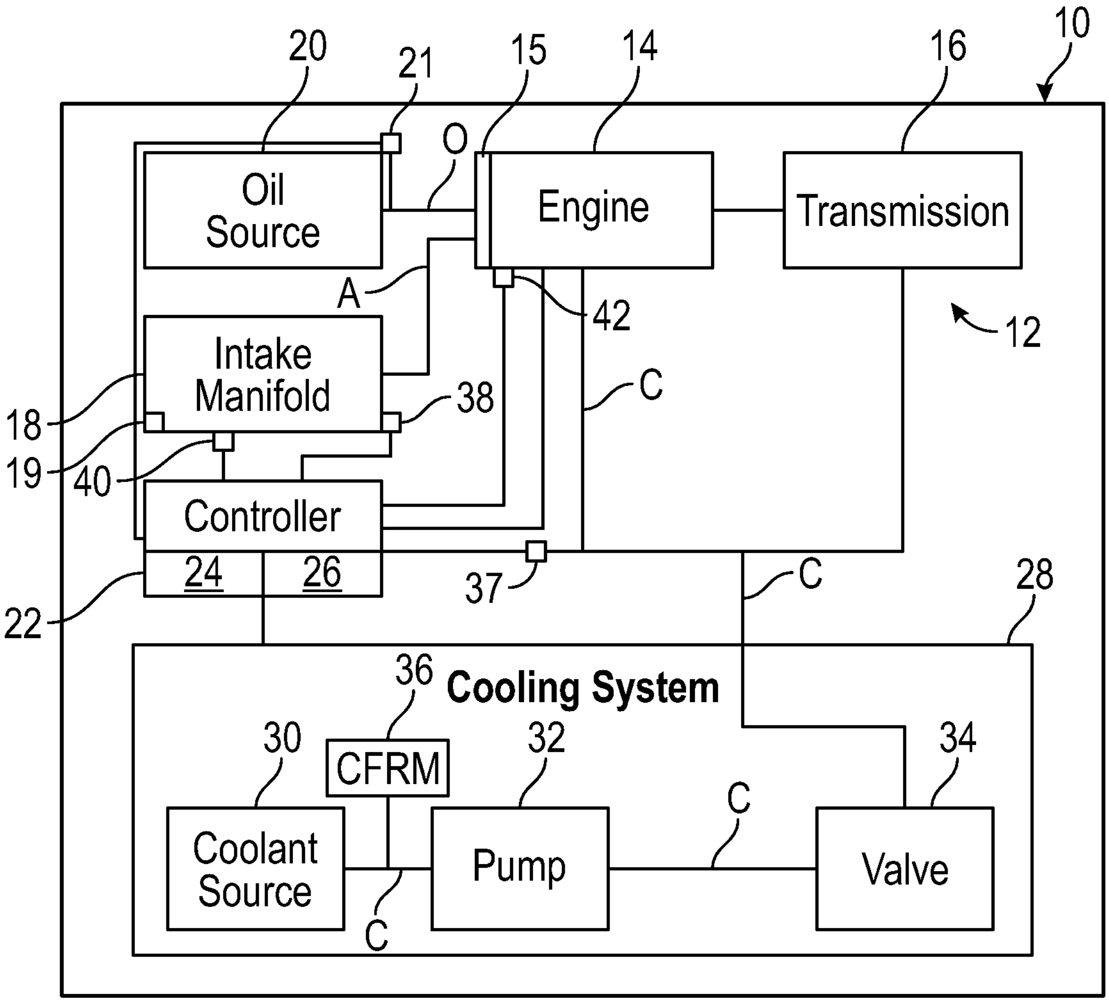
FIG. 1 is a schematic diagram of a vehicle system.

With reference to FIG. 1, a vehicle system 10 may be a car, a truck, a tractor, agricultural equipment, and/or systems thereof. The vehicle system 10 includes a propulsion system 12 for propulsion. The propulsion system 12 includes an internal combustion engine 14 and a transmission 16 mechanically coupled to the internal combustion engine. The internal combustion engine 14 has at least one engine wall 15. The engine wall 15 has a wall temperature. In addition, the propulsion system 12 includes an intake manifold 18 in fluid communication with the internal combustion engine 14. The intake manifold 18 is configured to direct air A to the internal combustion engine 14. The propulsion system 12 further includes an oil source 20 in fluid communication with the internal combustion engine 14. The oil source 20 supplies oil O, such as engine oil, to the internal combustion engine 14. The vehicle system 10 further includes a controller 22.

The controller 22 includes at least one processor 24 and a computer non-transitory readable storage device or media 26. The processor may be a custom made or commercially available processor, a central processing unit (CPU), a graphics processing unit (GPU), an auxiliary processor among several processors associated with the controller 22, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 22 in controlling a cooling system 28.

The cooling system 28 includes a coolant source 30, which contains coolant C. The cooling system 28 further includes a pump 32 in fluid communication with the coolant source 30. As such, the pump 32 is configured to extract the coolant C from the coolant source 30 and deliver it to the propulsion system 12. The controller 22 is electronic communication with the pump 32 in order to adjust a power thereof. The cooling system 28 further includes a valve 34. By adjusting the power of the pump 32, the volumetric flow rate of the coolant C delivered to the propulsion system 12 (i.e., internal combustion engine 14 and the transmission 16) may be adjusted in order to control the wall temperature of the engine wall 15. The cooling system 28 further includes a valve 34 in fluid communication with the pump 32 and the coolant source 30. The controller 22 is in electronic communication with the valve 34. Accordingly, the controller 22 may adjust the position of the valve 34 to adjust the volumetric flow rate of the coolant C to the propulsion system 12 (i.e., internal combustion engine 14 and the transmission 16) to control the wall temperature of the engine wall 15. The cooling system 28 further includes a (condenser-fan-radiator module) CFRM 36 for cooling the coolant C.

The vehicle system 10 further includes a throttle position sensor 38 in electronic communication with the controller 22. The throttle position sensor 38 is configured to detect the position of the throttle 19 of the intake manifold 18. The controller 22 is configured to determine the position of the throttle 19 based on the input from the throttle position sensor 38. The vehicle system 10 further includes a mass-air-flow (MAF) sensor 40 coupled to the intake manifold 18. The MAF sensor 40 is configured to measure the mass-air flow of the air A flowing into the internal combustion engine 14. The controller 22 is in electronic communication with the MAF sensor 40. Accordingly, the controller 22 is configured to determine the mass-air flow of the air A flowing into the internal combustion engine 14 based on input from the MAF sensor 40. The controller 22 is configured to determine the engine load as a function of the position of the throttle 19 and/or the mass-air flow of the air A entering the internal combustion engine 14.

The vehicle system 10 further engine speed sensor 42 configured to measure the engine speed of the internal combustion engine 14. The controller 22 is in electronic communication with the engine speed sensor 42. As such, the controller 22 is configured to determine the engine speed of the internal combustion engine 14 based on the input from the engine speed sensor 42.

The vehicle system 10 further includes an oil temperature sensor 21 to measure the temperature of the oil (i.e., the oil temperature). The controller 22 is in electronic communication with the oil temperature sensor 21. As such, the controller 22 is programmed to determine the oil temperature based on the input from the oil temperature sensor 21.

The vehicle system 10 further includes a pressure sensor 37 configured to measure the pressure of the coolant C. The pressure sensor 37 is in electronic communication with the controller 22. The controller 22 is programmed to determine whether the coolant C is boiling based on the input from the pressure sensor 37. In other words, the controller 22 is programmed to determine whether the coolant C is boiling based on the pressure of the coolant C.

Figure 2:
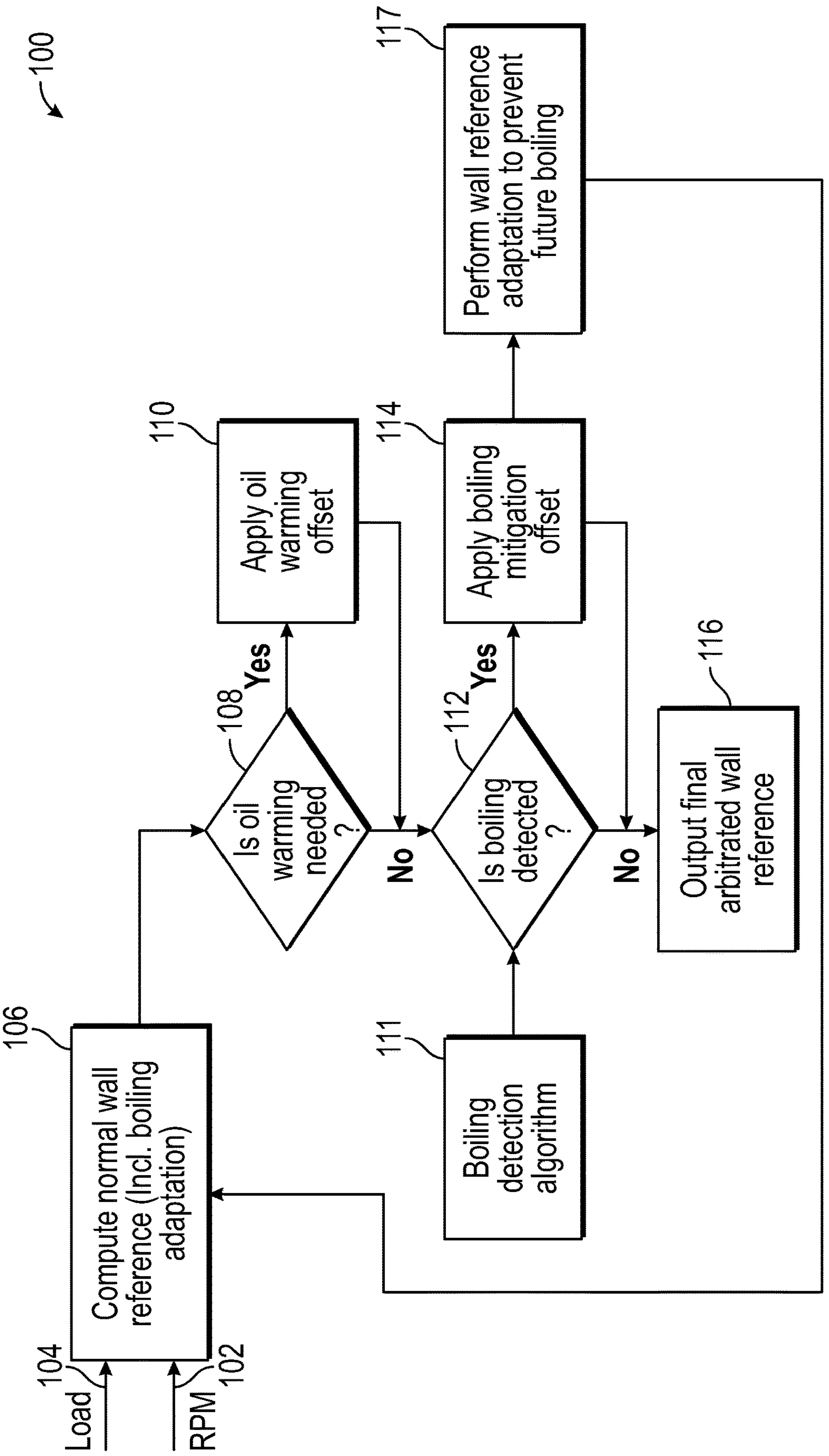
FIG. 2 is a flowchart of a method for cooling or heating a propulsion system using engine wall temperature.

FIG. 2 is a flowchart of a method 100 for cooling or warming the propulsion system 12 using engine wall temperature. The method 100 includes block 102, in which the engine speed (RPM) of the internal combustion engine 14 is determined. To do so, the controller 22 is programmed to determine the engine speed of the internal combustion engine 14 based on the input from the engine speed sensor 42. As discussed above, the engine speed sensor 42 is configured to measure the engine speed. The method 100 also includes block 104, in which the engine load (Load) of the internal combustion engine 14 is determined. To do so, the controller 22 may determine the engine load (Load) of the internal combustion engine 14 as a function of the mass-air flow of the air A flowing into the internal combustion engine 14 and/or the position of the throttle 19. As discussed above, the throttle position sensor 38 may be used to determine the position of the throttle 19, and the MAF sensor 40 may be used to determine the mass-air flow of the air A flowing into the internal combustion engine 14. Thus, the controller 22 is programmed to determine the engine load (Load) of the internal combustion engine 14 based on the inputs from the MAF sensor 40 and/or the throttle position sensor 38. The method 100 then proceeds to block 106.

At block 106, the controller 22 is programmed to determines a wall-reference temperature as a function of the engine load (Load) and the engine speed (RPM) of the internal combustion engine 14. During the first loop of the method 100, the boiling adaption is not performed at block 106. To determine the wall-reference temperature, testing is performed on a particular vehicle, to determine the optimal wall-reference temperature at each combination of engine load (Load) and engine speed (RPM). Then, a look-up table is created based on this testing. Accordingly, at block 106, the controller 22 is programmed to access the look-up table to determine the wall-reference temperature solely based on the engine load (Load) and the engine speed (RPM) of the internal combustion engine 14. Then, the method 100 continues to block 108.

At block 108, the controller 22 is programmed to determine whether oil warming is needed (i.e., whether the oil O has to be warmed). To do so, the controller 22 determines the oil temperature). The controller 22 determines the oil temperature of the engine oil O flowing through the internal combustion engine 14 based on the input of the oil temperature sensor 21. Also, the controller 22 compares the oil temperature of the oil engine O flowing through the internal combustion engine with a predetermined oil-temperature threshold. Then, the controller 22 determines whether the oil temperature of the engine oil O is less than the predetermined oil-temperature threshold. If the oil temperature is less than the predetermined oil temperature threshold, then the method 100 proceeds to block 110.

At block 110, the controller 22 applies an oil warming offset to the wall-reference temperature determined in block 106. To do so, the controller 22 subtracts an oil-warming-predetermined value from the wall-reference temperature. By lowering engine wall temperature reference, more energy will be transferred from the engine to the engine and transmission oils to facilitate the warming of the oil. Then, the method 100 proceeds to block 112. If the oil temperature is equal to or greater than the predetermined oil temperature threshold, then the method 100 proceeds directly to block 112 without performing block 110.

At block 112, the controller 22 determines whether the coolant C is boiling. To do so, controller 22 may execute a boiling detection algorithm. At block 111, the controller 22 may determine whether the coolant C is boiling based on the pressure of the coolant C. As discussed above, the pressure of the coolant C may be measured with the pressure sensor 37. If the controller 22 determines that the coolant C is boiling, then the method 100 proceeds to block 114.

At block 114, the controller 22 applies a boiling mitigation offset to the wall-reference temperature. To do so, the controller 22 subtracts a boiling-mitigation value from the wall-reference temperature after subtracting the oil-warming-predetermined value from the wall-reference temperature. Therefore, at this point, the boiling-mitigation value and the oil-warming-predetermined value have been subtracted from the wall-reference temperature. Reducing the engine wall temperature setpoint in the case of boiling would increase the coolant flow required through the engine, which will remove boiling. If the coolant C is not boiling, then the method 100 proceeds directly to block 116.

At block 116, the controller 22 outputs a final arbitrated wall-reference temperature after: a) solely subtracting the boiling-mitigation value from the wall-reference temperature; b) solely subtracting the subtracting the oil-warming-predetermined value from the wall-reference temperature; c) subtracting both the boiling-mitigation value and the oil-warming-predetermined value; or d) not changing the value of the wall-reference temperature depending on the outcome of the decision blocks 108 and 112. Also, at block 116, the controller 22 commands the cooling system 28 to adjust the volumetric flow rate of the coolant C flowing through the propulsion system 12 (i.e. internal combustion engine 14 and/or the transmission 16) to maintain the wall temperature at the wall-reference temperature as adjusted depending on the outcome of the decision blocks 108 and 112. To do so, the controller 22 commands the pump 32 to adjust its power and/or commands the valve 34 to adjust its position to adjust the volumetric flow rate of the coolant C flowing through the propulsion system 12 (i.e. internal combustion engine 14 and/or the transmission 16) to maintain the wall temperature at the wall-reference temperature.

Figure 3:
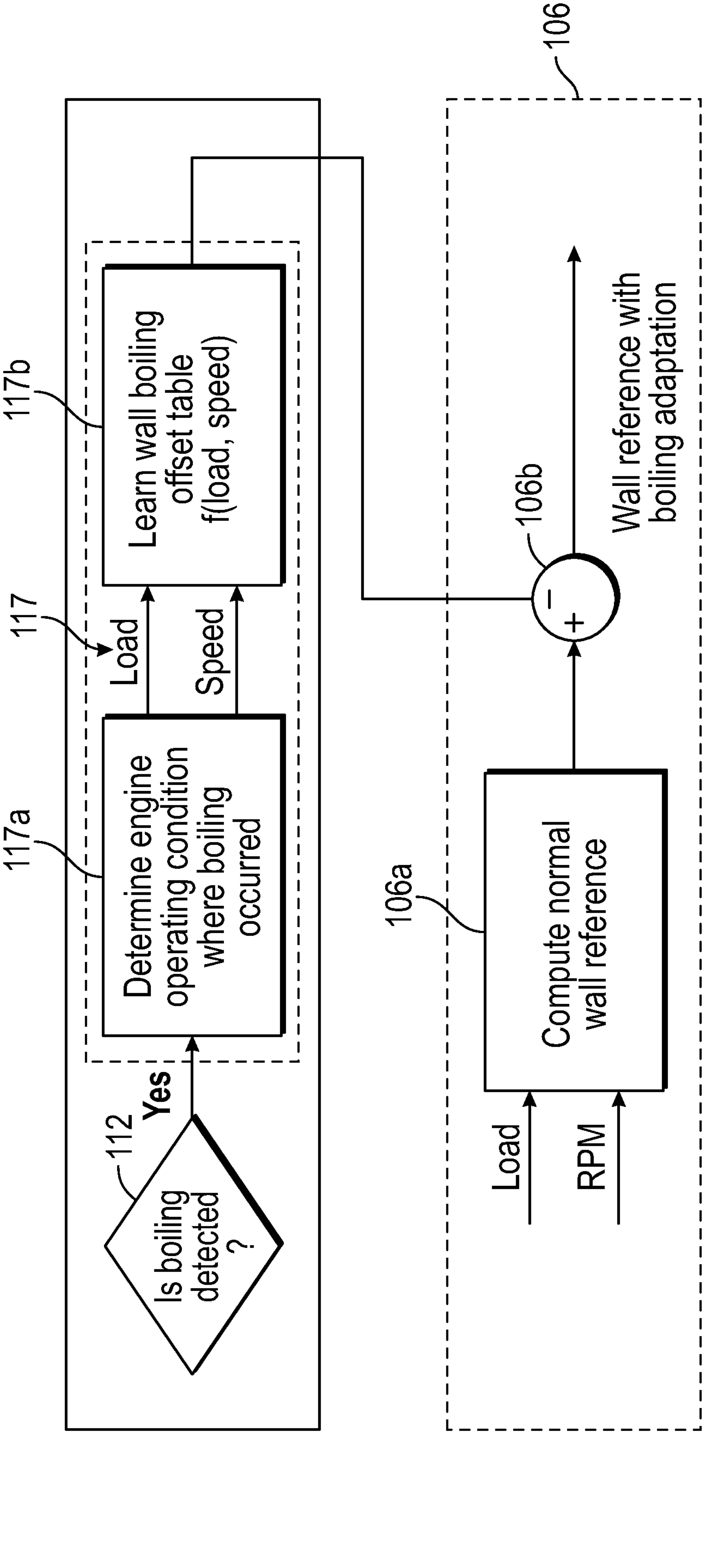
FIG. 3 is a flowchart of a subroutine of the method of FIG. 2.

With reference to FIGS. 2 and 3, the method 100 may further include block 117, which entails performing an adaptation of the wall-reference temperature to prevent future boiling in response to determining that the coolant C is boiling. After block 117, the method 100 returns to block 106, in which a wall-boiling offset value is applied to the wall-reference temperature. Specifically, the controller 22 subtracts the wall-boiling offset value from the wall-reference temperature to prevent coolant boiling in the future loops of the method 100.

With reference to FIG. 3, block 117 includes blocks **117*a* and blocks 117*b*. Blocks 117 is executed in response to determining that the coolant C is boiling at block 112. At block 117*a*, the controller 22 determines the engine operating conditions of the internal combustion engine 14 when the coolant is boiling. The operating conditions of the internal combustion engine 14 includes a boiling-engine load and a boiling-engine speed of the internal combustion engine 14. The terms "boiling-engine load" means the engine load of the internal combustion engine 14 at the time that the coolant C is boiling. The term "boiling-engine speed" means the engine speed of the internal combustion engine 14 at the time that the coolant C is boiling. The boiling-engine load and the boiling-engine speed may be determined as discussed above with respect to the engine load (Load) and the engine speed (RPM). After block 117*a*, block 117*b*** is executed.

At block **117*b*, the controller 22 learns a wall-boiling offset table as a function of the boiling-engine load and the boiling-engine speed of the internal combustion engine 14. The wall-boiling offset table includes a plurality of wall-boiling offset values that are each based on the boiling-engine load and the boiling-engine speed. Before any learning has been done, the offset values are initialized as 0. When learning condition is detected, the offset values corresponding to the boiling-engine load and boiling-engine RPM are incremented. This way the next time engine operates at this load and RPM, the wall reference will be lowered by this offset value to prevent repeating the boiling event. After block 117***b*, the method 100 returns to block 106, which includes blocks 106*a* and 106*b*.

At block 106*a*, the controller 22 determines a wall-reference temperature as a function of the engine load (Load) and the engine speed (RPM) as discussed above. After block 116*a*, block 116*b* is executed. At block 116*b*, the controller 22 applies a respective wall-boiling offset value of the plurality of wall-boiling points values in the wall-boiling offset table to the wall-reference temperature. The wall-boiling offset value is determined based on the engine load (Load) and the engine speed (RPM). Applying the wall-boiling offset value entails subtracting the respective wall-boiling offset value from the wall-reference temperature.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method, comprising:

determining an engine speed of an internal combustion engine, wherein the internal combustion engine has an engine wall, and the engine wall has a wall temperature;

determining an engine load of the internal combustion engine;

determining a wall-reference temperature as a function of the engine load and the engine speed of the internal combustion engine;

adjusting, using a cooling system, a volumetric flow rate of a coolant flowing through the internal combustion engine to maintain the wall temperature at the wall-reference temperature;

determining that oil warming is needed; and in response to determining that oil warming is needed, applying an oil warming offset to the wall-reference temperature, wherein applying the oil warming offset to the wall-reference temperature includes subtracting an oil-warming-predetermined value from the wall-reference temperature.

2. The method of claim 1, wherein determining that oil warming is needed includes:

determining an oil temperature of an engine oil flowing through the internal combustion engine;

comparing the oil temperature of the engine oil flowing through the internal combustion engine with a predetermined oil-temperature threshold; and determining that the oil temperature of the engine oil is less than the predetermined oil-temperature threshold.

3. The method of claim 1, further comprising determining that the coolant is boiling.

4. The method of claim 3, wherein, in response to determining that the coolant is boiling, applying a boiling mitigation offset to the wall-reference temperature.

5. The method of claim 4, wherein applying the boiling mitigation offset to the wall-reference temperature includes subtracting a boiling-mitigation value from the wall-reference temperature after subtracting the subtracting the oil-warming-predetermined value from the wall-reference temperature.

6. The method of claim 5, further comprising outputting, by a controller, a final arbitrated wall-reference temperature after subtracting the boiling-mitigation value from the wall-reference temperature and subtracting the oil-warming-predetermined value from the wall-reference temperature.

7. The method of claim 6, further comprising performing an adaptation of the wall-reference temperature to prevent future boiling in response to determining that the coolant is boiling.

8. The method of claim 7, wherein performing the adaptation of the wall-reference temperature includes:

determining engine operating conditions of the internal combustion engine when the coolant is boiling, wherein the engine operating conditions include a boiling-engine load and a boiling-engine speed of the internal combustion engine; and learning a wall-boiling offset table as a function of the boiling-engine load and the boiling-engine speed of the internal combustion engine, wherein the wall-boiling offset table includes a plurality of wall-boiling offset values that are each based on the boiling-engine load and the boiling-engine speed.

9. The method of claim 8, further comprising applying a respective wall-boiling offset value of the plurality of wall-boiling points values to the wall-reference temperature.

10. The method of claim 9, wherein applying the respective wall-boiling offset value of the plurality of wall-boiling offset values includes subtracting the respective wall-boiling offset value from the wall-reference temperature.

11. The method of claim 10, wherein the cooling system includes a pump and a valve in fluid communication with the pump, wherein adjusting, using the cooling system, the volumetric flow rate of the coolant flowing through the internal combustion engine to maintain the wall temperature at the wall-reference temperature includes adjusting a power of the pump.

12. The method of claim 11, wherein adjusting, using the cooling system, the volumetric flow rate of the coolant flowing through the internal combustion engine to maintain the wall temperature at the wall-reference temperature includes adjusting a position of the valve.

13. A vehicle system, comprising:

an internal combustion engine including an engine wall, wherein the engine wall has a wall temperature;

a cooling system in thermal communication with the internal combustion engine;

a controller in electronic communication with the cooling system, wherein the controller is programmed to:

determine an engine speed of an internal combustion engine, wherein the internal combustion engine has an engine wall, and the engine wall has a wall temperature;

determine an engine load of the internal combustion engine;

determine a wall-reference temperature as a function of the engine load and the engine speed of the internal combustion engine;

command the cooling system to adjust a volumetric flow rate of a coolant flowing through the internal combustion engine to maintain the wall temperature at the wall-reference temperature;

determine that oil warming is needed; and in response to determining that oil warming is needed, apply an oil warming offset to the wall-reference temperature by subtracting an oil-warming-predetermined value from the wall-reference temperature.

14. The vehicle system of claim 13, wherein the controller is programmed to:

determine that oil warming is needed by:

determining an oil temperature of an engine oil flowing through the internal combustion engine;

comparing the oil temperature of the oil engine flowing through the internal combustion engine with a predetermined oil-temperature threshold; and determining that the oil temperature of the engine oil is less than the predetermined oil-temperature threshold.

15. The vehicle system of claim 14, wherein the controller is programmed to:

determine that the coolant is boiling; and in response to determining that the coolant is boiling, the controller is programmed to apply a boiling mitigation offset to the wall-reference temperature by subtracting a boiling-mitigation value from the wall-reference temperature after subtracting the subtracting the oil-warming-predetermined value from the wall-reference temperature.

16. The vehicle system of claim 15, wherein the controller is programmed to output a final arbitrated wall-reference temperature after subtracting the boiling-mitigation value from the wall-reference temperature and subtracting the oil-warming-predetermined value from the wall-reference temperature.

* * * * *